(12) United States Patent
Sasaki et al.

(10) Patent No.: US 9,324,009 B2
(45) Date of Patent: Apr. 26, 2016

(54) MEDIA PROCESSING DEVICE

(71) Applicant: SEIKO EPSON CORPORATION, Tokyo (JP)

(72) Inventors: Toshiyuki Sasaki, Nagano (JP); Shogo Mizuyama, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/590,007

(22) Filed: Jan. 6, 2015

(65) Prior Publication Data

US 2015/0136855 A1    May 21, 2015

Related U.S. Application Data

(63) Continuation of application No. 13/543,536, filed on Jul. 6, 2012, now Pat. No. 8,955,753.

(30) Foreign Application Priority Data

Jul. 8, 2011    (JP) .................................. 2011-151546

(51) Int. Cl.
*G06K 13/16*    (2006.01)
*G06K 7/08*    (2006.01)
(Continued)

(52) U.S. Cl.
CPC . *G06K 13/16* (2013.01); *B41J 3/44* (2013.01); *B65H 29/62* (2013.01); *B65H 31/02* (2013.01); *B65H 31/06* (2013.01); *G06K 7/082* (2013.01);
(Continued)

(58) Field of Classification Search
CPC ............. B65H 2701/1912; B65H 2301/31124; B65H 2301/3122; B65H 2301/321; G06K 13/16; G06K 7/082; G06K 7/084; G06K 9/186; G06Q 20/042

USPC .......... 235/449, 440, 475, 479; 194/205, 210; 382/137–140; 705/45
See application file for complete search history.

(56) References Cited

U.S. PATENT DOCUMENTS 5,438,186 A      8/1995  Nair et al.
5,679,940 A *   10/1997  Templeton ............. G06Q 20/04
                                                              235/375

(Continued)

FOREIGN PATENT DOCUMENTS

CN      102673183 A     9/2012
JP      2004-243764 A   9/2004

(Continued)

OTHER PUBLICATIONS

Extended European Search Report issued Nov. 14, 2012, corresponding to European patent application No. 12175364.4.

*Primary Examiner* — Michael G Lee
*Assistant Examiner* — Suezu Ellis
(74) *Attorney, Agent, or Firm* — Hauptman Ham, LLP (57) ABSTRACT

A media processing device enables reading second media that do not bend easily from the device front with the same ease of use as processing first media that bend easily. The media processing device has a media conveyance path that guides first media inserted from a media insertion opening toward the back and then again toward the front on the front-back axis to the media exit. A straight conveyance path that angles to the inside on the device width axis is formed at a part connected to the media exit, and a second media insertion path that extends straight to the front from the straight conveyance path is connected to the media exit.

1 Claim, 6 Drawing Sheets

(51) Int. Cl.

| | | |
|---|---|---|
| *B65H 29/62* | (2006.01) | |
| *B65H 31/02* | (2006.01) | |
| *B65H 31/06* | (2006.01) | |
| *H04N 1/00* | (2006.01) | |
| *H04N 1/04* | (2006.01) | |
| *B41J 3/44* | (2006.01) | |

(52) U.S. Cl.
CPC ............ *G06K 7/084* (2013.01); *H04N 1/00594* (2013.01); *H04N 1/00596* (2013.01); *H04N 1/00615* (2013.01); *H04N 1/00631* (2013.01); *H04N 1/0461* (2013.01); *B65H 2301/3122* (2013.01); *B65H 2301/31124* (2013.01); *B65H 2301/321* (2013.01); *B65H 2701/1912* (2013.01)

(56) References Cited

U.S. PATENT DOCUMENTS

| | | | |
|---|---|---|---|
| 7,056,047 B2 | 6/2006 | Sasaki et al. | |
| 7,210,630 B2* | 5/2007 | Nagata | G06K 13/16 235/379 |
| 7,349,884 B1* | 3/2008 | Odom | G06Q 20/042 705/40 |
| 7,435,023 B2 | 10/2008 | Sasaki et al. | |
| 7,477,427 B2* | 1/2009 | Fujikawa | B41J 13/12 235/454 |
| 7,770,793 B2 | 8/2010 | Sasaki et al. | |
| 8,061,914 B2 | 11/2011 | Sasaki et al. | |
| 8,794,732 B2 | 8/2014 | Tsuchiya | |
| 2005/0242172 A1 | 11/2005 | Murata | |
| 2006/0210342 A1 | 9/2006 | Fujikawa et al. | |
| 2009/0076921 A1* | 3/2009 | Nelson | G06Q 20/20 705/16 |
| 2009/0206152 A1 | 8/2009 | Embury et al. | |
| 2011/0049020 A1* | 3/2011 | Finnie | G07D 11/0006 209/534 |
| 2013/0063752 A1 | 3/2013 | Sasaki et al. | |
| 2014/0009517 A1 | 1/2014 | Sasaki et al. | |
| 2015/0151936 A1* | 6/2015 | Xu | B41J 13/12 271/275 |

FOREIGN PATENT DOCUMENTS

| | | |
|---|---|---|
| JP | 2004-297761 A | 10/2004 |
| JP | 2007-137035 A | 6/2007 |
| WO | 2009/036323 A1 | 3/2009 |
| WO | 2012/124613 A2 | 9/2012 |

\* cited by examiner

MEDIA PROCESSING DEVICE

RELATED APPLICATIONS

This application is a continuation of U.S. application Ser. No. 13/543,536, filed Jul. 6, 2012 and is based on, and claims priority from, Japanese Application Number 2011-151546, filed Jul. 8, 2011, the disclosure of which is hereby incorporated by reference herein in its entirety.

BACKGROUND

1. Technical Field

The present disclosure relates to a media processing device, such as a check processing device, having an optical reading unit that reads an image of a medium conveyed through a curved conveyance path. The disclosure relates more specifically to a media processing device that is extremely easy to operate and can scan images from both first media, such as checks that bend easily, and second media, such as driver licenses and other cards that do not bend easily.

2. Related Art

Checks are commonly used in bank operations for settling deposit and withdrawal processes. When a check is used to settle a transaction, the date and signature on the check are confirmed at the teller window, the necessary deposit or withdrawal process is completed, and the check used in the transaction is then endorsed on the back. A receipt related to the check process is then given to the customer. A driver license or other type of identification card is typically required to confirm the identity of the person presenting the check in each transaction, and a copy of the identification card may be taken and stored as needed. These processes must be frequently performed in a short time at the teller window.

These processes are increasingly performed electronically. More specifically, magnetic information and optical information is captured from the checks using magnetic ink character readers (MICR) and optical scanners, and checks are endorsed with a printer.

Japanese Unexamined Patent Appl. Pub. JP-A-2004-243764, for example, teaches a compact multifunction printer having a magnetic ink character reader (MICR), optical scanner, check printhead, and receipt printhead enabling processing checks in batches in the confined space of a teller window. This multifunction printer has a conveyance path that curves in a U-shaped configuration when seen in plan view for conveying checks and other slips, and another conveyance path perpendicular thereto for conveying continuous paper for printing receipts, and disposes a single printhead for printing both checks and receipts where these two conveyance paths intersect.

Japanese Unexamined Patent Appl. Pub. JP-A-2004-297761 teaches a data reading device that uses an image scanning sensor disposed to a check conveyance path that curves in a U-shape to read a license or other identification card that does not bend easily. Using the data reading device described in JP-A-2004-297761, check processing and customer verification processing required for check processing can be efficiently performed using a single device.

In check processing devices with a U-shaped check conveyance path the check conveyance path is formed from the front of the device, curves at the back of the device, and then returns to the front again, enabling the operator to insert the check to be processed and retrieve the check after processing is completed from the front. However, while checks can be easily handled from the front using the data reading device disclosed in JP-A-2004-297761, scanning media such as cards from the front can sometimes not be done easily.

More specifically, in the data reading device described in JP-A-2004-297761, the check conveyance path curves in a U-shape when seen in plan view, the image scanning sensor is disposed to the part of the check conveyance path that extends straight widthwise to the printer at the back of the device, and the license or card media to be imaged is inserted from one side at the back of the device to this part of the conveyance path. The operator must therefore look at the side of the device and extend the hand holding the card to the side of the device to insert the card. Because the place where the card is inserted from the side cannot be directly seen, the device can be difficult for the operator to use. In addition, if the card is inserted by guessing instead of looking at the card entrance that opens to the side at the back of the device, the edge of the card may hit the side of the case instead of entering the opening, and the case or the card may be damaged.

SUMMARY

A media processing device according to the disclosure enables scanning cards and other second media that do not bend easily. The second media are scanned from the front of the device with the same ease of use as processing checks and other first media that bend easily.

A media processing device according to the disclosure has a device case with a media entrance and a media exit; a media conveyance path formed in the device case to guide first media inserted from the media entrance from the front to the back on a front-back axis, and then from the back to the front on the front-back axis to the media exit, where when the device case is placed upright on a flat surface one direction parallel to the surface is the front-back axis, the direction parallel to the surface and perpendicular to the front-back axis is a device width axis, and the direction perpendicular to the surface is a vertical axis; a straight conveyance path connected to the media conveyance path at the media entrance or the media exit; a straight second media insertion path that extends from the media entrance or the media exit on a line extending the straight conveyance path toward the front on the front-back axis, and is formed in a top part of the device case facing up on the vertical axis, for inserting second media from the media entrance to the straight conveyance path or discharging second media to the outside of the straight conveyance path from the media exit; and an optical reading unit that images media passing through the straight conveyance path. The straight conveyance path and the second media insertion path extend in a direction on the front-back axis or a direction slanted an acute angle to the front-back axis; and the insertion direction of the first media inserted from the media entrance, or the discharge direction of the first media discharged from the media exit, is a direction different from the second media insertion path, and is a direction on the front-back axis or a direction slanted an acute angle to the front-back axis.

The direction of the second insertion path to which second media such as cards that do not bend easily are inserted is a direction slanted an acute angle to the insertion direction of first media inserted from the media entrance or the discharge direction of first media discharged from the media exit of the media conveyance path that conveys first media such as checks that bend easily. Second media can therefore be inserted to the media conveyance path from the second insertion path formed in the top of the media processing device, and the second media can be imaged using the image reading unit disposed to the straight conveyance path, without interfering with first media inserted to the media conveyance path or first media discharged from the media conveyance path. As a result, the second media insertion path can be disposed to a position adjacent to the media entrance or the media exit of the media conveyance path. Second media can therefore be handled in the same way as first media are handled from the device front while looking directly at the second media insertion path, and the ease of scanning second media or handling second media can be improved.

In order to suppress increasing device dimensions and make the device small and compact, and particularly to suppress increasing the device width, the insertion direction of the first media inserted from the media entrance, or the discharge direction of the first media discharged from the media exit, is a direction on the front-back axis; and the direction of the straight conveyance path and the second media insertion path is slanted toward the front on the front-back axis at an acute angle to the inside on the device width axis relative to the direction on the front-back axis.

In order to assure sufficient length in the conveyance path for conveying the second media past the reading position of the image reading unit when the straight conveyance path portion of the media conveyance path is short or the length of the second media in the conveyance direction is long, an extension path that extends straight along a linear extension of the straight conveyance path is formed from the back end of the straight conveyance path on the front-back axis, and the end of the extension path at the back on the front-back axis is open to the device back.

When the straight conveyance path is a conveyance path connected to the media exit of the media conveyance path, and has an exit pocket that recovers first media discharged from the media exit, the second media insertion path is preferably disposed to the inside of the exit pocket on the device width axis, the exit pocket extends on the front-back axis, and the direction of the straight conveyance path and the second media insertion path is slanted toward the front on the front-back axis at an acute angle to the inside on the device width axis relative to the direction on the front-back axis.

When checks are used as the first media, for example, the cards or other second media are smaller in width than the first media. When the bottom of the straight conveyance path of the media conveyance path is determined by a channel of a specific depth that is open at the top on the vertical axis, and the exit pocket is a recessed part that is open at the device top and has a bottom at the same height as the channel bottom of the straight conveyance path, the second insertion path is disposed at a height in the middle of the straight conveyance path in the channel depth direction. More specifically, the bottom of the second media insertion path is at a height between the channel bottom of the straight conveyance path and the channel top opening that is open to the top on the vertical axis, and the second media inserted from the second media insertion path to the straight conveyance path is conveyed through the straight conveyance path at the same height as the bottom of the second media insertion path. This enables disposing the second media insertion path at a position higher than the bottom of the straight conveyance path, and makes inserting second media with a narrow width easier than inserting them from the device top to the bottom of the straight conveyance path channel.

The media processing device according to the disclosure can be used as a check processing device. In this case, the configuration described above is complemented by a magnetic reading unit that reads magnetic information from first media conveyed through the media conveyance path, and a media print unit that prints on first media conveyed through the media conveyance path, the media conveyance path is a check conveyance path, and the second media insertion path is formed as a card insertion path.

Other objects and attainments together with a fuller understanding of the disclosure will become apparent and appreciated by referring to the following description and claims taken in conjunction with the accompanying drawings.

DETAILED DESCRIPTION

An embodiment of a media processing device according to the present disclosure is described below with reference to the accompanying figures. The media processing device according to this embodiment of the disclosure is a check processing device that processes checks, which are a type of first media that bends easily. This check processing device has a card scanning mechanism for imaging driver licenses and similar cards, which are a type of second media that does not bend easily, for customer verification when processing checks, and a receipt printing mechanism for issuing receipts on which processed check information, for example, is printed. The disclosure can be similarly applied to media processing devices for processing first media that bend easily other than checks. The disclosure can also be applied to media processing devices that do not have a receipt printing mechanism.

Figure 1:
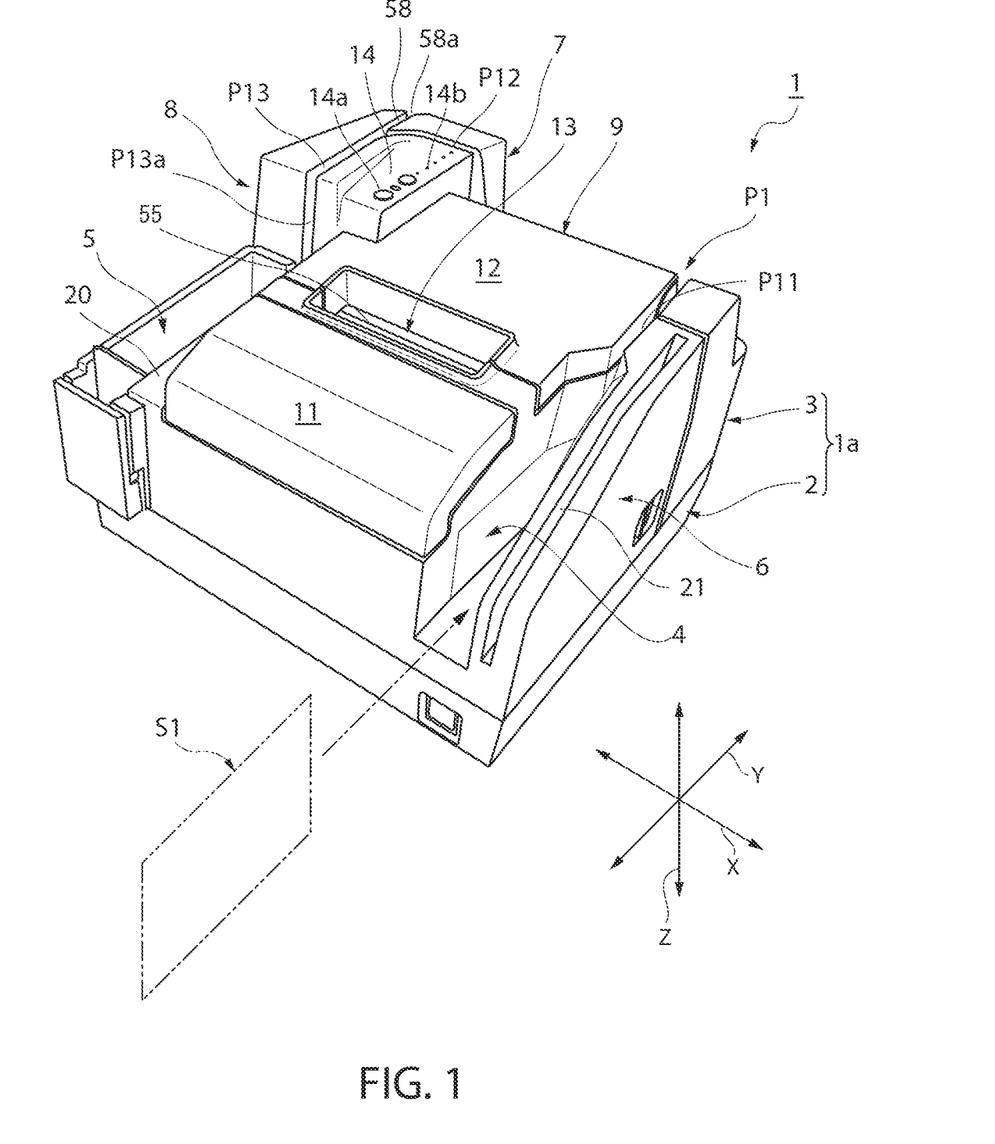
FIG. 1 is an oblique view showing a check processing device according to the disclosure.
Figure 2:
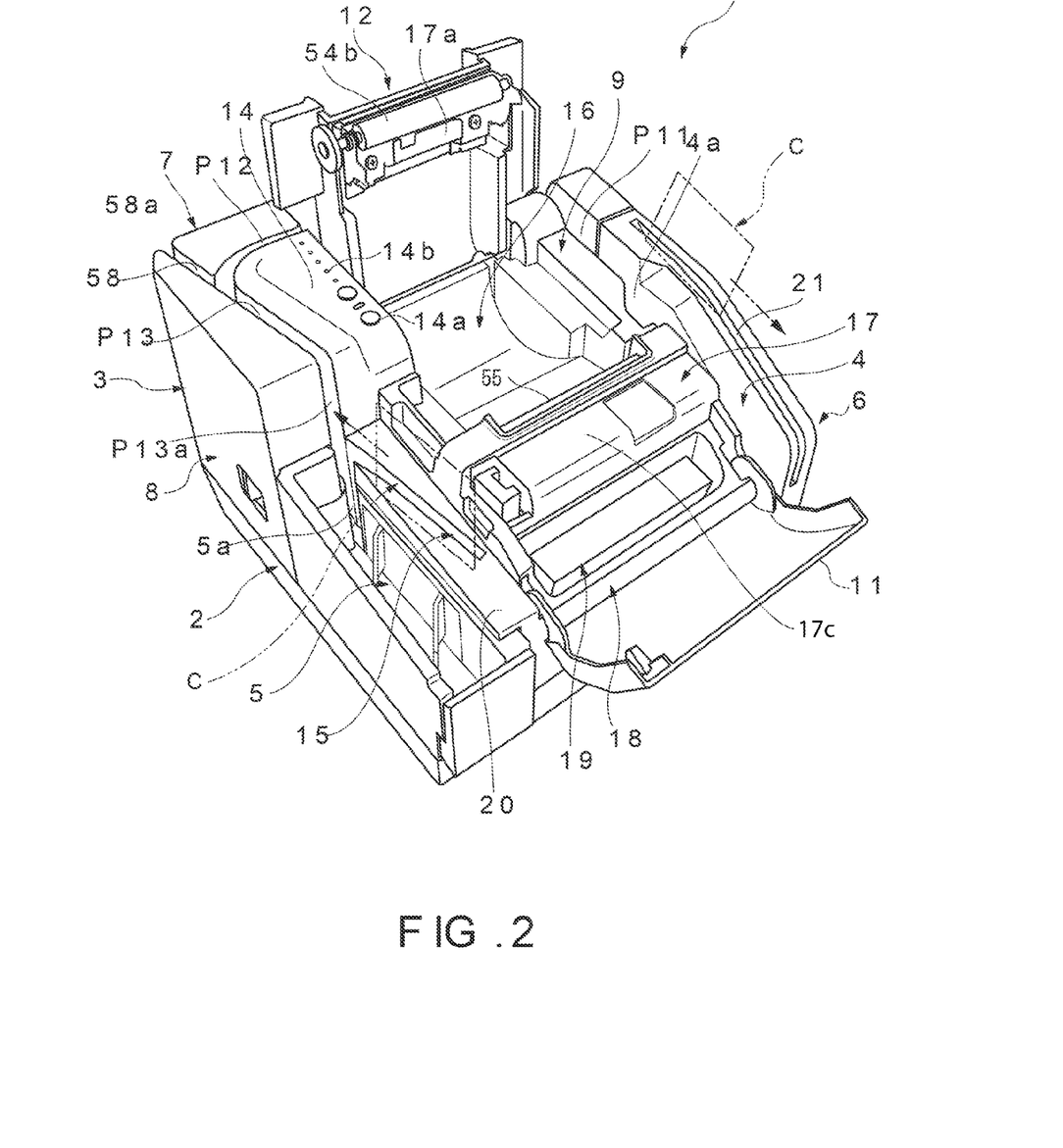
FIG. 2 is an oblique view of the check processing device shown in FIG. 1 with the two top covers open.
Figure 3:
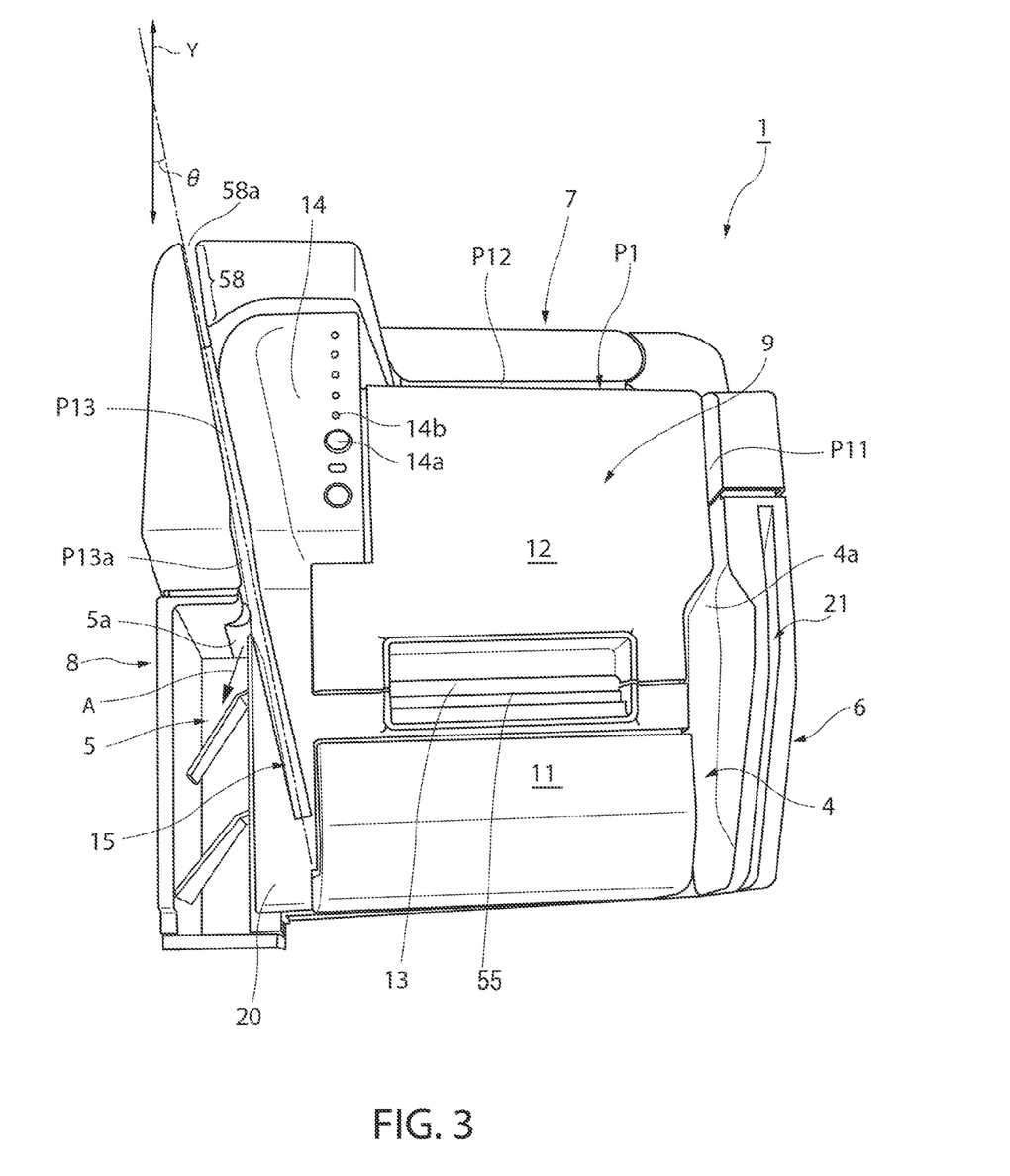
FIG. 3 is an oblique view of the check processing device shown in FIG. 1 when seen from above.

FIG. 1 is an oblique view of a check processing device according to an embodiment of the disclosure from diagonally above the front right side. FIG. 2 is an oblique view of the check processing device from diagonally above the front left side with open front and back covers disposed to the top. FIG. 3 is an oblique view of the check processing device from the top front side.

Referring to these figures, the case 1a of the check processing device 1 includes a rectangular bottom case part 2 of a specific thickness, and a top case part 3 disposed thereabove. An entry pocket 4 to which a check S1 to be processed is inserted, a check conveyance path P1 through which the check S1 fed from the entry pocket 4 is conveyed, and an exit pocket 5 for recovering the check S1 delivered from the check conveyance path P1, are formed in the top case part 3. Reading magnetic ink character data from the check S1, printing an endorsement on the check S1, and imaging both sides of the check S1, are performed in this order while the check S1 is conveyed through the check conveyance path P1. Note that when the check processing device 1 is placed in the normal upright operating position on a flat level surface as shown in FIG. 1, the side of the check processing device 1 (case 1a) facing the user is referred to below as the front, the opposite side as the back, the direction between this front and back is the longitudinal axis Y, the direction parallel to the level surface and perpendicular to the longitudinal axis Y is the transverse axis X, and the direction perpendicular to the level surface is the vertical axis Z.

The check path from the entry pocket 4 through the check conveyance path P1 to the exit pocket 5 is a vertical channel of a specific width that is formed in the top case part 3 and open at the top on the vertical axis Z. As shown in FIG. 1, a check S1 is inserted to the entry pocket 4 standing on edge with the long sides at top and bottom, and is conveyed through the check conveyance path P1 and discharged into the exit pocket 5 in this same posture. The check conveyance path is a substantially U-shaped path that opens to the front when seen in plan view.

More specifically, as shown in FIG. 3, the entry pocket 4 extends from the front toward the back of the top case part 3 on the right side of the transverse axis X, and the upstream path P11 portion of the check conveyance path P1 extends straight toward the back of the device from the check insertion opening 4a formed at the back end of the entry pocket 4. The downstream part of the upstream path portion P11 curves to the inside on the transverse axis X and joins the back path P12 portion of the check conveyance path P1. The back path P12 extends substantially straight on the transverse axis X, and the downstream end part thereof curves toward the front of the device and joins the downstream path P13 portion of the check conveyance path P1. The downstream path P13 is a straight path that is slanted at an acute angle to the inside of the device width relative to the longitudinal axis Y, and in this embodiment of the disclosure continues at an angle of approximately 10 to 20 degrees. The downstream end of the downstream path P13 connects through a check discharge opening 5a to the exit pocket 5. The exit pocket 5 continues to the front of the device along the longitudinal axis Y.

The top case part 3 is divided by this U-shaped check conveyance path into a right case member 6, rear case member 7, left case member 8, and an inside case member 9 located thereinside. A front cover 11, a back cover 12, a receipt exit 13 for the receipt printer described below, and an operating panel 14 are disposed on the top of the inside case member 9. A card insertion path 15 for inserting a card C to be read by the card scanner described below is also provided.

As shown in FIG. 2, the front cover 11 can open to the front pivoting at a position at the device front, and the back cover 12 can open to the back pivoting at a position at the device back. The receipt exit 13 is formed between the distal end of the front cover 11 and the distal end of the back cover 12, and has a narrow rectangular shape extending widthwise to the device. The operating panel 14 is formed at a place at the back side of the device on the left side of the back cover 12, is a substantially flat surface formed at a slightly higher position, and has a plurality of operating switches 14a and a display unit 14b with a plurality of LEDs for indicating the operating status.

A roll paper compartment 16 is formed inside the inside case member 9 in the area covered by the back cover 12. When the back cover 12 opens, the roll paper compartment 16 is open to the top and roll paper R (see FIG. 5) can be loaded or replaced. An automatic cutter 17 for cutting widthwise across the continuous paper S2 (see FIG. 5) is disposed inside the inside case member 9 in the area covered by the front cover 11. The continuous paper S2 is delivered from the roll paper R stored in the roll paper compartment 16. Information corresponding to check information, for example, is printed on the continuous paper S2 conveyed from the roll paper R, and the trailing end of the printed portion is cut to issue a receipt of a specific length from the receipt exit 13. An ink cartridge compartment 18 is located on the device front side of the automatic cutter 17, and an ink cartridge 19, which is the ink supply source for printing checks, is installed therein. When the front cover 11 opens, the drive unit 17c of the automatic cutter 17 is exposed and the ink cartridge compartment 18 is open at the top, thus enabling inspection of the automatic cutter 17 and replacing the ink cartridge easily from the top of the device.

As shown in FIG. 2 and FIG. 3, the card insertion path 15 is formed in the flat top part 20 on the left side of the front cover 11 in the top of the inside case member 9. This top part 20 is at a lower position than the operating panel 14 at the back. The card insertion path 15 is a straight channel of a specific width and a specific depth that is open at the top in this top part 20. The rear end of the card insertion path 15 at the back of the device is connected to the top of the downstream end entrance P13a to the downstream path P13 portion of the check conveyance path P1, and the front end of the card insertion path 15 at the device front side is located near the side of the front cover 11. As shown in FIG. 3, the card insertion path 15 is a straight insertion path extending along an extension of the downstream path P13, which is a straight conveyance path, toward the device front. More specifically, the card insertion path 15 extends to the inside of the device in the direction slanted at an acute angle to the longitudinal axis Y.

To scan an image of a card C that does not bend easily, the card C is inserted to the card insertion path 15 from the device front and pushed to the back as indicated in FIG. 3. The card C pushed into the card insertion path 15 is conveyed from the card insertion path 15 to the downstream path P13, and is imaged by the optical reader 43 (see FIG. 4) described below for scanning checks that is disposed to the downstream path P13. After scanning, the card C is conveyed from the downstream path P13 to the card insertion path 15 at the device front.

A card slot 21 for reading magnetic information from card C that does not bend easily is also formed in the check processing device 1 according to this embodiment of the disclosure. This card slot 21 is formed in the top part of the right case member 6 of the top case part 3. A magnetic reader not shown is disposed inside this right case member 6, and magnetic information stored on the card C is read by pulling the card C from the rear end of the card slot 21 through the card slot 21 to the device front.

Figure 4:
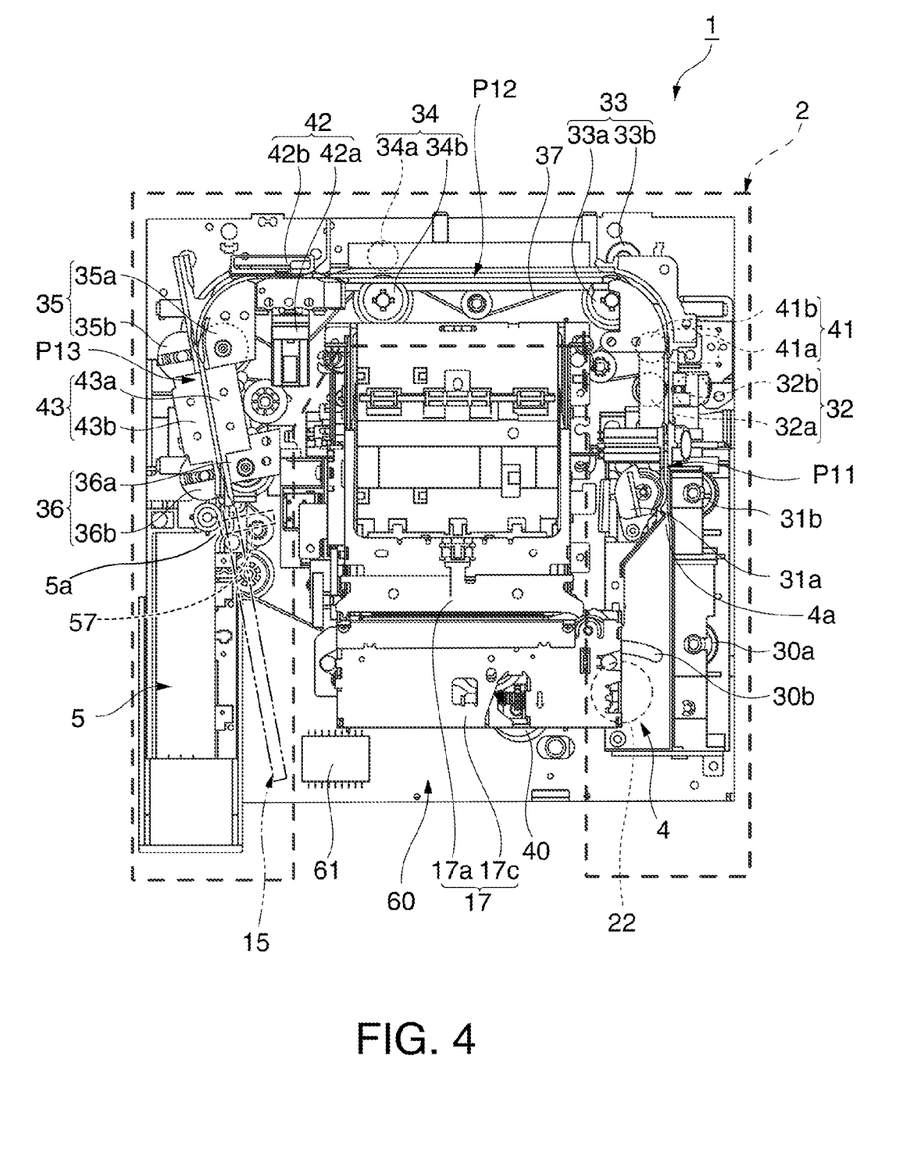
FIG. 4 shows the configuration of the check conveyance mechanism in the check processing device shown in FIG. 1.

FIG. 4 shows main parts of the check conveyance mechanism for conveying a check S1 through the U-shaped check conveyance path. The check conveyance mechanism is described below with reference to this figure.

A paper feed roller 30a is disposed to the side on the right case member 6 side of the entry pocket 4, and a pressure member 30b is disposed to the side on the same side as inside case member 9. The pressure member 30b pushes a check S1 inserted to the entry pocket 4 to the paper feed roller 30a side. The check S1 is fed into the upstream path P11 of the check conveyance path P1 by the paper feed roller 30a, which is driven by an in-feed motor 22. In this embodiment the check S1 is inserted standing on edge to the entry pocket 4 with the back of the check facing the inside of the device (the side of the inside case member 9).

A feed roller 31a that feeds the check S1 supplied from the entry pocket 4, and a retard roller 31b that faces the feed roller 31a with the upstream path P11 therebetween, are disposed to the upstream path P11 of the check conveyance path P1. The feed roller 31a is driven by the in-feed motor 22, and turns synchronously to the paper feed roller 30a. The retard roller 31b is rotated to the feed roller 31a side, and separates and feeds the checks S1 one at a time downstream.

A plurality of conveyance roller pairs 32 to 36 are disposed in the conveyance path parts of the check conveyance path P1 downstream from the feed roller 31a. Conveyance roller pair 32 is disposed to the upstream path P11, conveyance roller pairs 33 and 34 are disposed to the back path P12, and the remaining conveyance roller pairs 35 and 36 are disposed to the downstream path P13. Each of the conveyance roller pairs 32 to 36 has a drive roller 32a, 33a, 34a, 35a, 36a on the inside case member 9 side, and a follower roller 32b, 33b, 34b, 35b, 36b on the outside right case member 6, rear case member 7, or left case member 8 side opposite the corresponding drive roller with the check conveyance path P1 therebetween. The drive rollers 32a, 33a, 34a, 35a, 36a are synchronously driven rotationally by a drive motor 40 through an endless belt 37. The follower rollers 32b, 33b, 34b, 35b, 36b are rotated by a rotating member not shown to the corresponding drive roller 32a-36a side.

A magnetic reading unit 41 is also disposed to the upstream path P11 of the check conveyance path P1. The magnetic reading unit 41 has a magnetic scanner 41a such as an MICR unit that can read magnetic information recorded in magnetic ink, for example, on the check S1. The magnetic scanner 41a is disposed to the right case member 6 with the magnetic reading surface facing the upstream path P11. A pressure roller 41b is disposed opposite the magnetic reading surface of the magnetic scanner 41a with the upstream path P11 therebetween. The conveyed check S1 is pressed to the magnetic reading surface of the magnetic scanner 41a by the pressure roller 41b, and the magnetic information is reliably read by the magnetic scanner 41a.

A check print unit 42 that prints an endorsement on the back of the check S1 is disposed to the back path P12, which extends continuously from the downstream end of the upstream path P11 widthwise to the device, in an area on the left corner side of the device. The check print unit 42 has an inkjet line head 42a disposed extending vertically to the device with the nozzle surface of the inkjet line head 42a facing the back path P12. A platen 42b that defines the printing position of the inkjet line head 42a is disposed to a place on the rear case member 7 facing the nozzle surface with the back path P12 therebetween. As described with reference to FIG. 2, the ink supply source of the inkjet line head 42a is the ink cartridge 19 loaded in the ink cartridge compartment 18. Note that a thermal head could be used instead of an inkjet head 42a. Using a line head as in this embodiment is desirable because the check print unit 42 can be made more compact than when a serial head is used.

The conveyance roller pairs 35 and 36 are disposed to the downstream path P13 of the check conveyance path P1, and the optical reader 43 for imaging both sides of the check S1 is disposed to the portion of the conveyance path between these roller pairs. The optical reader 43 has an optical scanner 43a for imaging the front of the check S1 and an optical scanner 43b for imaging the back disposed with the scanning surfaces thereof facing each other with the downstream path P13 therebetween.

The downstream end of the downstream path P13 is connected to the check discharge opening 5a that discharges the processed check S1 after reading magnetic information, printing an endorsement, and imaging are completed into the exit pocket 5. The exit pocket 5 is open at the top, and a check S1 deposited into the exit pocket 5 can be removed from above. Because both the entry pocket 4 and exit pocket 5 are open at the top, the operator can always handle the check S1 from above the front of the check processing device 1.

Figure 5:
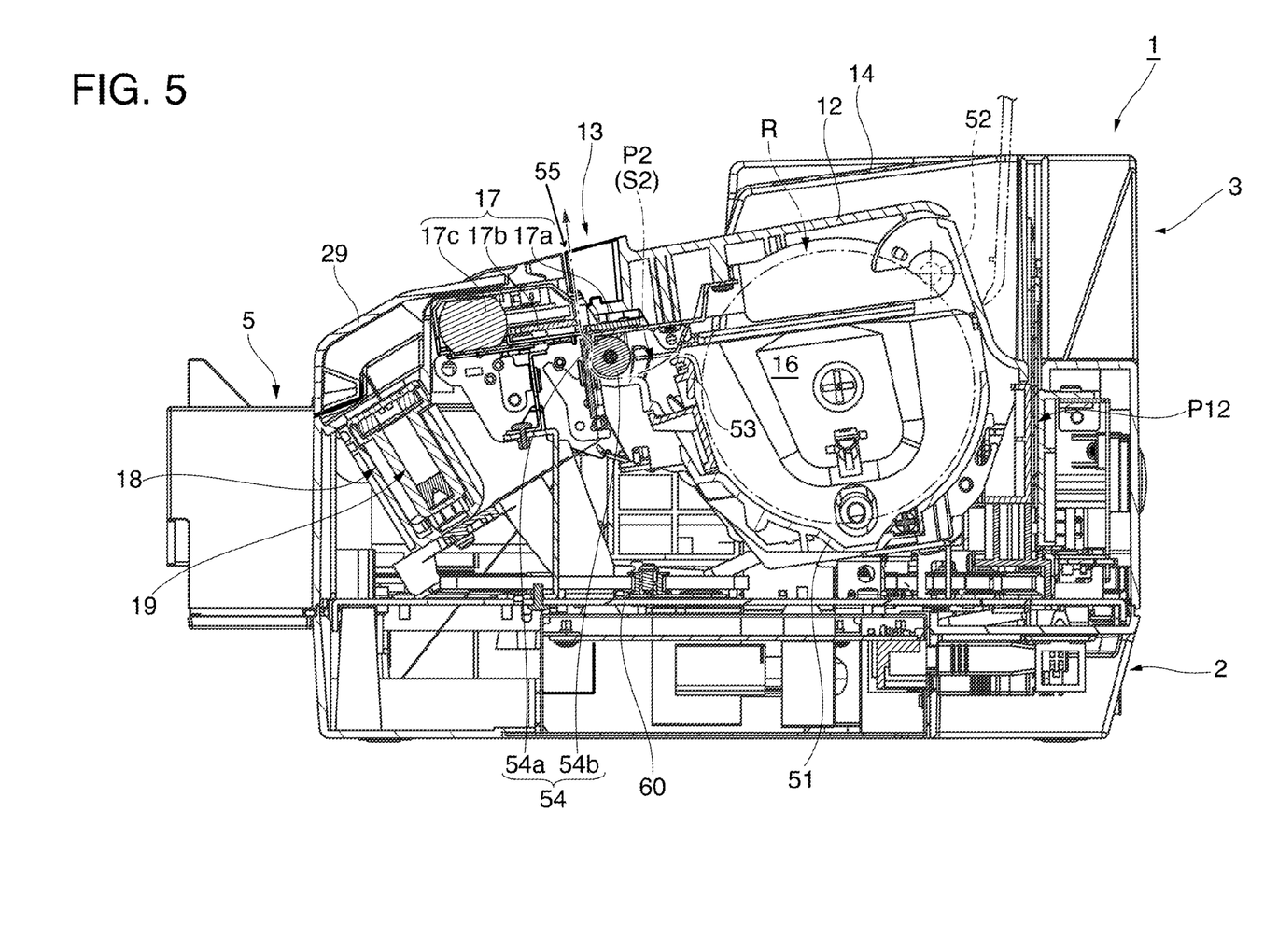
FIG. 5 is a vertical section view showing the receipt printing mechanism in the check processing device shown in FIG. 1.

FIG. 5 is a vertical section view of the check processing device 1. The receipt printing mechanism assembled in the inside case member 9 of the top case part 3 is described next primarily with reference to this figure. The receipt printing mechanism includes the roll paper compartment 16 that holds the roll paper R described above. The roll paper compartment 16 holds the roll paper R so that the roll can rotate freely horizontally widthwise to the device. The continuous paper path P2 that guides the continuous paper S2 pulled from the roll paper R to the receipt exit 13 extends from the roll paper compartment 16 to the device front with the width of the paper path aligned with the device width.

The bottom of the roll paper compartment 16 is defined by a curved concave bottom panel 51, and the top opening is covered by the back cover 12. The back end of the back cover 12 is supported by a hinge 52 of which the center axis is the pivot axis extending transversely, and the back cover 12 opens and closes pivoting on this hinge 52.

The continuous paper S2 pulled from the roll paper R in the roll paper compartment 16 is guided by a paper guide 53, which is attached to the front edge part of the bottom panel 51, to the continuous paper print unit 54. A guide roller that rotates freely to reduce the rolling resistance to the roll paper R may be disposed to the bottom of the roll paper compartment 16, and the roll paper R placed thereon.

The continuous paper print unit 54 includes a thermal line head 54a and a platen roller 54b that conveys while pressing the continuous paper S2 to the printhead surface of the thermal head 54a. In this embodiment, the thermal line head 54a is disposed to the side of the inside case member 9, and the platen roller 54b is mounted at a position on the distal end side of the back cover 12.

The automatic cutter 17 is disposed above the continuous paper print unit 54. The automatic cutter 17 includes a fixed knife 17a, and a drive unit 17c including a movable knife 17b. The fixed knife 17a is disposed on the back cover 12 side, and the movable knife 17b and drive unit 17c are disposed on the side of the inside case member 9. The continuous paper S2 passes the cutting position of the automatic cutter 17 after passing the printing position of the continuous paper print unit 54, and is discharged to the top from the receipt exit 13 open above the automatic cutter 17. Note that a cutter 55 (see FIG. 1 to FIG. 3) is provided widthwise to the device along the front edge of the receipt exit 13, enabling the operator to cut the continuous paper S2 at a desirable position.

In addition to a receipt printing mechanism, the check processing device 1 has a card scanner mechanism for imaging the card C inserted from the card insertion path 15. Referring to FIG. 4, the card scanner mechanism includes the card insertion path 15, and a card sensor 57 that detects a card C inserted from the card insertion path 15. The card sensor 57 could be a photocoupler or other optical sensor, or a mechanical switch, for example.

When insertion of a card C to the card insertion path 15 is detected by the card sensor 57, the conveyance roller pairs 35, 36 of the check processing mechanism disposed to the downstream path P13 turn. In addition, a card in-feed operation that conveys the card C inserted from the card insertion path 15 along the downstream path P13 toward the device back, and a card out-feed operation that conveys and returns the in-fed card C to the device front into the card insertion path 15, are performed. A card scanning operation that images the card C conveyed from the downstream path P13 to the card insertion path 15 using the optical reader 43 used for check imaging is also performed.

As shown in FIG. 1 and FIG. 3, the discharge direction of the check S1 that is recovered into the exit pocket 5 from the straight downstream path P13 through which the check S1 is conveyed, that is, the direction in which the check S1 is discharged through the check discharge opening 5a into the exit pocket 5, is aligned with the longitudinal axis Y or a direction at an acute angle relative to the longitudinal axis Y toward the outside of the device width. The discharged checks S1 are collected in the exit pocket 5 aligned in the direction of the longitudinal axis Y and stacked sequentially widthwise to the device. The direction of the card insertion path 15, however, continues in line with an extension of the downstream path P13, and is a direction at an acute angle to the inside towards the front of the device relative to the longitudinal axis Y.

A card C can therefore be inserted from the card insertion path 15 to the downstream end entrance P13a of the downstream path P13 and scanned without interference from the checks S1 even when checks S1 are stacked aligned with the longitudinal axis Y in the exit pocket 5. As a result, the card insertion path 15 can be located beside the exit pocket 5 at the device front, and cards C can be handled in the same way as checks S1 by looking directly at the card insertion path 15 from the device front. Card C scanning is therefore easier and handling cards C can be improved.

In addition, the exit pocket 5 is a recessed pocket that extends in the direction of the longitudinal axis Y, and the card insertion path 15 is disposed to the inside of the device from the exit pocket 5. The card insertion path 15 can therefore be provided without increasing device width. Note that if there is sufficient room in the device width, the card insertion path 15 could be provided extending at an acute angle to the outside on the outside of the exit pocket 5 extending on the longitudinal axis Y.

As shown in FIG. 1 to FIG. 3, a straight extension path 58 extends from the upstream end of the downstream path P13, that is, from the junction with the downstream end of the back path P12, in line with an extension of the downstream path P13 towards the device back. The back end 58a of this extension path 58 is open at the back of the device.

More specifically, when the downstream path P13 is short, or when the length of the card C in the conveyance direction is long, the length of the downstream path P13 alone may not be sufficient for operations that convey all of the card C past the reading position of the optical reader 43 (specifically, the operation that scans the entire surface of the card C in the conveyance direction). This embodiment enables such operations, however, by forming the extension path 58 with the back end 58a thereof open at the back.

This embodiment also forms the card insertion path 15 in the top part 20 at a height in the middle of the depth of the downstream path P13. More specifically, the bottom of the card insertion path 15 is located at a height between the bottom and the open top of the downstream path P13 channel. The width of driver license cards and other personal identification cards is generally smaller than the width of most common checks S1. Because the height of the downstream path P13 corresponds to the check S1 width, the elevation of the card insertion path 15 can be disposed to a higher position if the upper part of this downstream path P13 is used as the conveyance path for scanning cards, and a card C can be inserted more easily than when the card C is inserted to the lower part of the check conveyance path P1 below the top part 20.

Operation of the check processing device 1 is controlled by a microprocessing unit (MPU) or other control unit 61. As shown in FIG. 4, the control unit 61 is mounted on a circuit board 60 disposed to the top of the bottom case part 2. Maintenance is improved by updating a driver, for example, by controlling the check processing mechanism, receipt printing mechanism, and card scanning mechanism of the check processing device 1 with a single control unit 61. Note that the control unit 61 may be provided as a control circuit board disposed to the back side of the circuit board 60 (the opposite side as the side on which the check conveyance path P1 is formed) instead of on the top of the circuit board 60 as shown in FIG. 4.

When a check S1 is inserted from the device front to the entry pocket 4, the control unit 61 controls driving the in-feed motor 22 of the check processing mechanism and feeds the check S1 into the check conveyance path P1 by means of the paper feed roller 30a. Synchronized to this, the control unit 61 controls driving the drive motor 40 and conveys checks S1 one by one through the upstream path P11 by means of the feed roller 31a and retard roller 31b.

As the check S1 is conveyed through the upstream path P11, the control unit 61 first controls the magnetic reading unit 41 to read the magnetic information from the check S1, and captures the magnetic information that was read. Next, the control unit 61 prints an endorsement on the back of the check S1 with the check print unit 42 based on the read magnetic information. The control unit 61 then controls the optical reader 43 to image both sides of the check S1, and captures the scanned image information. The imaged check S1 is then discharged by the conveyance roller pair 36 into the exit pocket 5.

The user's workload can be reduced because reading magnetic information, printing an endorsement, and imaging can be done in a single continuous process by the check processing mechanism of the check processing device 1.

The control unit 61 also controls the in-feed motor 22 of the receipt printing mechanism to rotationally drive the platen roller 54b and convey the continuous paper S2 from the roll paper R through the continuous paper path P2. While the continuous paper S2 is conveyed between the thermal line head 54a and platen roller 54b, necessary information is printed on the continuous paper S2 as controlled by the control unit 61. The printed continuous paper S2 is then discharged to the outside from the receipt exit 13 by the platen roller 54b. When the printed leading end of the continuous paper S2 has been discharged and the trailing end of the printed portion reaches the cutting position of the automatic cutter 17, continuous paper S2 conveyance stops, the automatic cutter 17 is driven by the control unit 61 to cut widthwise, and the printed portion of the continuous paper S2 is cut off. The printed sheet that is cut to a specific length is then issued as a receipt.

When the control unit 61 detects based on output from the card sensor 57 that a card C was inserted to the card insertion path 15, it controls driving the drive motor 40 of the check conveyance mechanism and drives the conveyance roller pairs 35, 36 for check conveyance to perform the card in-feed operation that conveys the card C inserted to the card insertion path 15 into the downstream path P13. The length of the card C in the conveyance direction is detected during the card in-feed operation based on the output from the card sensor 57.

The card in-feed operation stops when the trailing end in the in-feed direction of the card C has passed the reading position of the optical reader 43. The conveyance roller pairs 35, 36 are then driven in reverse, and the card out-feed operation that discharges the card C starts. The optical reader 43 is driven during the card out-feed operation to perform the scanning operation that images the front and back sides of the card C passing the scanning position. The card out-feed operation stops after the card C is fed a specific distance after the trailing end in the out-feed direction of the card C is detected by the card sensor 57. Images of the card C are thus captured.

A configuration in which the magnetic information and image information are passed to the control unit 61 is described in this embodiment, but the captured information could be output to an external device such as a computer or display. In this case, output from the external device could be input to the control unit 61, and the control unit 61 could print using the check print unit 42 and continuous paper print unit 54 based on commands from the external device.

A configuration in which the drive motor 40 of the check processing mechanism and the paper feed motor of the receipt printing mechanism are separately provided is described above, but the platen roller 54b of the receipt printing mechanism could obviously also be driven by the drive motor 40 on the check processing mechanism side through a speed reducer, pulley, and endless belt.

In this check processing device 1 as described above, the check discharge direction A in which checks S1 are discharged into the exit pocket 5 and the recovery direction in which checks S1 are recovered into the exit pocket 5 from the check conveyance path P1 that conveys checks S1 that bend easily are different from the insertion direction of the card insertion path 15 to which cards C are inserted for imaging cards C that do not bend easily. Cards C can therefore be inserted from the card insertion path 15 to the downstream path P13 of the check conveyance path P1 and the cards C can be imaged without interference from a check S1 even when a check S1 has been recovered in the exit pocket 5. As a result, the card insertion path 15 can be located adjacent to the exit pocket 5 located at the device side, and cards C can be handled in the same way as checks S1 are handled from the device front while looking directly at the card insertion path 15. The ease of scanning cards C and card C handling can therefore be improved.

In addition to scanning cards C, each part of the check processing device 1 can be operated from the device front as shown in FIG. 1 to FIG. 3. Operability is therefore better, and operations such as replacing roll paper and replacing the ink cartridge can be performed more easily than when parts must be operated from the side or back and the operator must reach around to the side or back of the device.

Furthermore, because the check conveyance path P1 and continuous paper path P2 are separated in this check processing device 1, the check S1 conveyed through the check conveyance path P1 and the continuous paper S2 conveyed through the continuous paper path P2 can be conveyed independently. In addition, checks S1 and continuous paper S2 will not contact each other even if conveyed simultaneously, and paper jams should therefore not occur. Yet further, because the check print unit 42 that prints on checks S1, and the continuous paper print unit 54 that prints on continuous paper S2, are at separate locations and print independently, checks S1 and continuous paper S2 can be printed simultaneously or with a specific time gap therebetween irrespective of the printing status of the other.

Yet further, the continuous paper path P2 is a conveyance path that extends in the part enclosed by the U-shaped check conveyance path P1 to the device front on the open side of the U. A continuous paper path P2 of the required length can therefore be assured without interfering with the check conveyance path P1, and the parts of the receipt printing mechanism can be arranged more efficiently in the space surrounded by the U-shaped check conveyance path P1 than when the continuous paper path P2 extends in the device width direction. A check processing device 1 with a receipt printing mechanism that is small and compact overall can therefore be achieved.

Figure 6A:
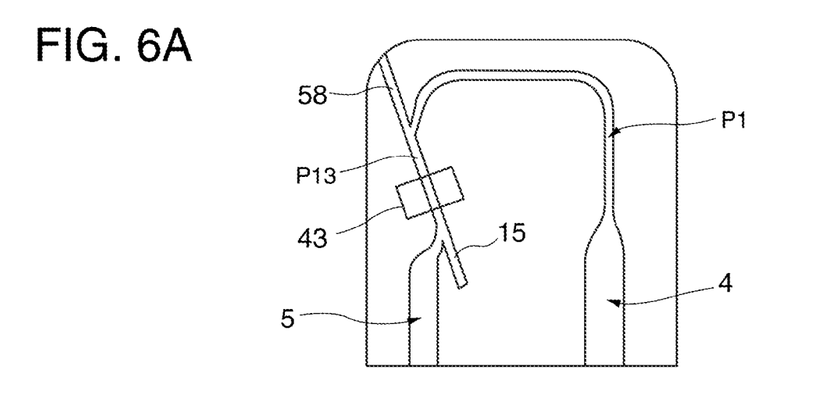
FIGS. 6A, 6B, and 6C show examples of card insertion paths.
Figure 6B:
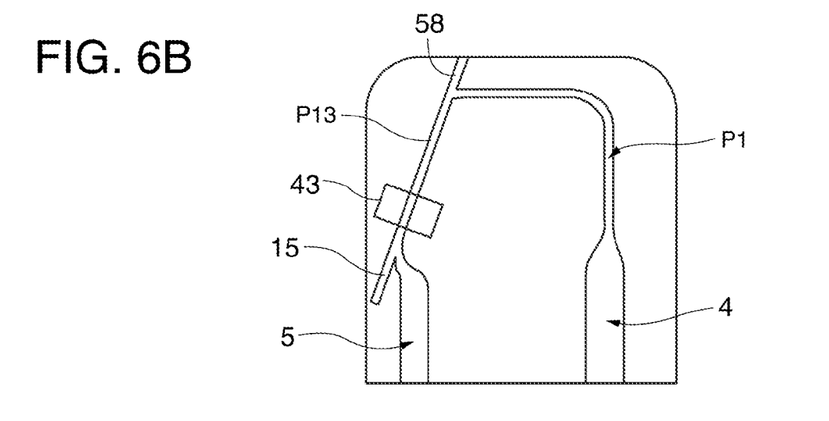
Figure 6C:
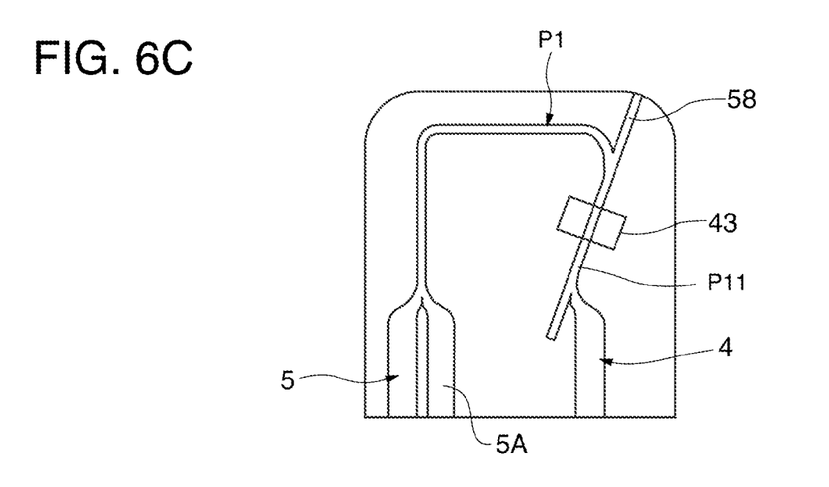

As shown in FIG. 6A, the card insertion path 15 for card scanning is located at a position beside the inside side of the exit pocket 5. Alternatively, as shown in FIG. 6B, the card insertion path 15 can be located on the outside of the exit pocket 5 in the device width direction. Further alternatively, as shown in FIG. 6C, the card insertion path 15 can be located on the entry pocket 4 side on the inside in the device width direction. For example, when a discharge pocket 5A into which checks S1 that cannot be processed is provided beside the exit pocket 5, the card insertion path 15 is preferably located on the entry pocket 4 side. In this case, the upstream path P11 of the check conveyance path P1 is a straight path, and the optical reader 43 for scanning checks, or a dedicated optical reader 43 for scanning cards, is located in this area. Further alternatively, the card insertion path 15 can be located on the outside of the entry pocket 4 in the device width direction.

The disclosure being thus described, it may be varied in many ways. Such variations are not to be regarded as a departure from the spirit and scope of the disclosure, and all such modifications are intended to be included within the scope of the following claims.

What is claimed is:

1. A media processing device comprising:
   a first media conveyance path configured to guide a first media;
   a first media entrance configured to receive and guide the first media into the first media conveyance path;
   a first media exit configured to discharge the first media from the first media conveyance path;
   a second media conveyance path configured to guide a second media;
   a second media entrance configured to receive and guide the second media into the second media conveyance path; and
   a second media exit configured to discharge the second media from the second media conveyance path,
   wherein the first media entrance and the second media entrance face opposite sides of the media processing device, and
   wherein the second media entrance is disposed, relative to a media path extending from the first media entrance to the first media exit, between the first media entrance and the first media exit.

* * * * *